US008520509B2

(12) United States Patent
Tarnanen

(10) Patent No.: US 8,520,509 B2
(45) Date of Patent: Aug. 27, 2013

(54) SYSTEM AND A METHOD FOR ROUTING DATA TRAFFIC

(75) Inventor: Jarkko Tarnanen, Helsinki (FI)

(73) Assignee: Teliasonera AB, Stockholm (SE)

( * ) Notice: Subject to any disclaimer, the term of this patent is extended or adjusted under 35 U.S.C. 154(b) by 440 days.

(21) Appl. No.: 12/686,544

(22) Filed: Jan. 13, 2010

(65) Prior Publication Data
US 2010/0177632 A1 Jul. 15, 2010

(30) Foreign Application Priority Data
Jan. 15, 2009 (EP) .................................... 09150635

(51) Int. Cl.
*G06F 11/00* (2006.01)
(52) U.S. Cl.
USPC ........................................................ 370/225
(58) Field of Classification Search
USPC .................. 370/225, 217, 219, 220
See application file for complete search history.

(56) References Cited

U.S. PATENT DOCUMENTS

| 6,981,174 | B1 | | 12/2005 | Hanning | |
|---|---|---|---|---|---|
| 7,092,357 | B1 | * | 8/2006 | Ye | 370/230 |
| 7,345,991 | B1 | | 3/2008 | Shabtay et al. | |
| 7,529,187 | B1 | * | 5/2009 | Hernacki et al. | 370/230 |
| 2003/0031192 | A1 | * | 2/2003 | Furuno | 370/409 |
| 2005/0163044 | A1 | * | 7/2005 | Haq et al. | 370/219 |
| 2006/0002289 | A1 | | 1/2006 | Menon et al. | |
| 2006/0126496 | A1 | | 6/2006 | Filsfils et al. | |
| 2007/0214275 | A1 | * | 9/2007 | Mirtorabi et al. | 709/230 |

FOREIGN PATENT DOCUMENTS

| WO | 2006/060491 | 6/2006 |
|---|---|---|
| WO | 2007/002495 | 1/2007 |

* cited by examiner

*Primary Examiner* — Mark Rinehart
*Assistant Examiner* — Mohammad Anwar
(74) *Attorney, Agent, or Firm* — Drinker Biddle & Reath LLP

(57) ABSTRACT

A communication system and a method for routing data traffic from and to a backbone network where a first Provider Edge device (302) routes data traffic between a first Customer Edge device (304) and the backbone network via a primary route (306), the first Customer Edge device (304) providing a primary connection to the backbone network, and the first Customer Edge device (304) is adapted to be in an active state or an inactive state, in which inactive state the first Customer Edge device (304) is disabled for any routing. The communication system and method provide: monitoring (501, 503) of the data traffic of the first Customer Edge device (304); detection of failure (502, 504) of the data traffic of the first Customer Edge device (304); setting of the state (506) of the first Customer Edge device (304) to the inactive state when failure of the data traffic of the first Customer Edge device (304) is detected; and provision of a secondary connection to the backbone network via a secondary route (318). At least one computer program product ($602_1, \ldots, 602_n$) comprising software code portions for performing the steps of the method.

9 Claims, 6 Drawing Sheets

SYSTEM AND A METHOD FOR ROUTING DATA TRAFFIC

This application claims priority under 35 U.S.C. §119 to European Patent Application No. 09150635.2, filed on Jan. 15, 2009, which is incorporated by reference herein in its entirety.

TECHNICAL FIELD

The present invention relates to a communication system comprising a first Provider Edge device connectable to a backbone network, a first Customer Edge device providing a primary connection to the backbone network, the first Provider Edge device being adapted to route data traffic between the first Customer Edge device and the backbone network via a primary route, and the first Customer Edge device is adapted to be in an active state or an inactive state, in which inactive state the first Customer Edge device is disabled for any routing, and the system is adapted to provide a secondary connection to the backbone network via a secondary route. Further, the present invention relates to a method for routing data traffic from and to a backbone network where a first Provider Edge device routes data traffic between a first Customer Edge device and the backbone network via a primary route, the first Customer Edge device providing a primary connection to the backbone network, and the first Customer Edge device is adapted to be in an active state or an inactive state, in which inactive state the first Customer Edge device is disabled for any routing.

BACKGROUND OF THE INVENTION

Redundant connections are provided in various networks, e.g. the Internet, to secure the data traffic in networks and between networks. A redundant connection is a connection to a network or networks, e.g. the Internet, backed up with secondary resources. A redundant connection has more than one connection to a network to secure the transmission of data over or to the network in case the primary connection fails. If the primary route for data traffic fails in some way, a secondary route for the data traffic is provided.

Today, network operators may have routing problems in Core and Edge/border networks which may cause failures of the data traffic and data communication, such as traffic break-ups or intermittent connections in delicate redundant connections between the customer's communication devices and the backbone network. The backbone network can cover a Core and/or an Edge network. Redundant connections must be secure to provide secure data traffic, and in relation to the customers, the redundant connections must have high Service Level Agreement requirements.

Operators are currently using Border Gateway Protocol, BGP, in their backbone network. The BGP is the core routing protocol of the Internet. BGP works by maintaining a table of Internet Protocol, IP, networks or "prefixes" which designate network reachability among autonomous systems, AS. BGP can be described as a path vector protocol. BGP does not use traditional Interior Gateway Protocol, IGP, metrics, but makes routing decisions based on path, network policies and/ or rule sets.

Securing of redundant subscriptions at Local Area Network, LAN, level is implemented by applying a Hot Standby Router Protocol, HSRP, protocol which is used by routers for monitoring and controlling each other's status. HSRP decides which router handles the traffic of subscription. Securing of connection from the customer's communication device to the backbone network is implemented by dynamic BGP and this may cause corrupted routing to the backbone network at certain failure situations. When interruptions or failures occurs at the router components, routing information can still be transferred between customer devices and the gateway of the backbone network, and the connection or data transfer can appear to function without any problems, although the routing table is broken or at least incorrect and cannot function properly. A consequence of corrupted routing tables is that IP traffic cannot be routed from this gateway to backbone network.

The routing table is an electric document of IP addresses, which stores the routes to various nodes in a network, where the nodes can be any kind of electric device connected to the network. The routing table is usually stored in a router or networked computer in the form of a database or a file. When data needs to be sent from one node to another node, the routing table is referred to in order to find the best possible route for the transfer of data. In dynamic routing, the network devices themselves automatically build and maintain their own routing tables. They do this by exchanging information regarding the network topology using routing tables.

U.S. Pat. No. 6,981,174-B1 discloses a method for a redundant port system in which any port in a packet-forwarding device can be designated as a redundant port for any other port. The redundant port system detects when the primary port fails or is about to fail, and activates or begins to activate the redundant port as a backup.

WO 2007/002495-A2 discloses a method and an apparatus for providing convergence for dual-homed site in a network, where an occurrence of a failure between a first Provider Edge device and a first Customer Edge device in communication with a dual-homed site is detected.

THE OBJECT OF THE INVENTION

Another problem identified by the inventor of the present invention is that Edge routers are unable to detect corrupted routing tables and the Edge routers try to continue routing as usual, i.e. the Edge routers keep sending default-route information to the customer device and keep routing customer IP information via corrupted routes. These problems in prior art will be discussed in more detail in connection with FIGS. 1-2 of the appended drawings. A further problem is that prior art network monitoring may not be able to detect these problems, and therefore, network operators cannot immediately react to the problems, only when complaints are received from customers.

There is a need for improved routing of data traffic where a primary route and a secondary route for data traffic are provided, where the secondary route acts as a backup.

The object of the present invention is thus to improve the routing of data traffic where a primary route and a secondary route for data traffic are provided.

SUMMARY OF THE INVENTION

The above-mentioned object of the present invention is attained by providing a communication system comprising a first Provider Edge device connectable to a backbone network, a first Customer Edge device providing a primary connection to the backbone network, the first Provider Edge device being adapted to route data traffic between the first Customer Edge device and the backbone network via a primary route, and the first Customer Edge device is adapted to be in an active state or an inactive state, in which inactive state the first Customer Edge device is disabled for any routing, and the system is adapted to provide a secondary connection to the backbone network via a secondary route, wherein the system comprises control means for setting the state of the Customer Edge device, monitoring means for monitoring the data traffic of the first Customer Edge device, and detection means for detecting failure of the data traffic of the first Customer Edge device, and the control means are adapted to set the state of the first Customer Edge device to the inactive state when failure of the data traffic of the first Customer Edge device is detected, whereupon the system is adapted to provide the secondary connection to the backbone network via the secondary route.

The above-mentioned object of the present invention is also attained by providing a method for routing data traffic from and to a backbone network where a first Provider Edge device routes data traffic between a first Customer Edge device and the backbone network via a primary route, the first Customer Edge device providing a primary connection to the backbone network, and the first Customer Edge device is adapted to be in an active state or an inactive state, in which inactive state the first Customer Edge device is disabled for any routing, the method comprising the following steps:

monitoring the data traffic of the first Customer Edge device;
detecting failure of the data traffic of the first Customer Edge device;
setting the state of the first Customer Edge device to the inactive state when failure of the data traffic of the first Customer Edge device is detected; and
providing a secondary connection to the backbone network via a secondary route.

When common failures occurs, conventional redundant configurations, applying BGP and HSRP, according to prior art can manage the rerouting functionalities. However, the inventor of the present invention has identified situations where the conventional redundant and rerouting functionalities do not function properly, because no failure is identified when seen from the Customer Edge or Provider Edge point of view. These situations may occur when there is a routing problem in the Edge network or in the Core network.

By the present invention, the routing of data traffic, where a primary route and a secondary route for data traffic are provided, is efficiently improved, and the reliability of the redundancy of the communication system is improved in an efficient way. By the present invention, the data traffic of the primary route, or the redundant connection, can be forced to quickly pass over, or re-routed, to the forced secondary route without any unnecessary delay, where the delay may result in data losses. Since the first Customer Edge device is inactivated and thereby disabled for any routing of data traffic, no routing information can reach the first Customer Edge device, and the system cannot wrongly assume that the data transfer of the Customer Edge device functions without any problems or failures and cannot continue as if data traffic is routed via the first Customer Edge device in a correct way. By the present invention, the required backup functionality is initiated if the backup is not initiated by the conventional redundant configuration.

The backbone network can cover a Core network, an Edge network, or a Core network and an Edge network, or the backbone network can cover any other network or networks.

According to an advantageous embodiment of the communication system according to the present invention, the system comprises a second Provider Edge device connectable to the backbone network, and a second Customer Edge device providing the secondary connection to the backbone network, the second Provider Edge device being adapted to route data traffic between the second Customer Edge device and the backbone network via said secondary route.

According to a further advantageous embodiment of the communication system according to the present invention, the first Customer Edge device is adapted to be in a Hot Standby Router Protocol state which is inactive or active, and the control means are adapted to set the Hot Standby Router Protocol state of the first Customer Edge device. Hereby, the routing of data traffic is further improved.

According to another advantageous embodiment of the communication system according to the present invention, the control means are adapted to disable the Wide Area Network interface associated with the first Customer Edge device when the control means set the state of the first Customer Edge device to the inactive state. Hereby, it is further made sure that no routing is originated from the first Provider Edge, and the traffic is routed via the secondary route, which provides a further improved routing of data traffic. Further, by this embodiment, the network operator will rapidly receive information that a routing problem has occurred, since the first Customer Edge device will trigger an alarm when its Wide Area Network interface is disabled, and the network operator can start any necessary investigation. How a Customer Edge device triggers an alarm when its Wide Area Network interface is disabled is known in prior art. Any asymmetric routing is hereby also avoided, where IP traffic from the customer network to the backbone network is routed via the secondary route, whereas IP traffic from the backbone network to the customer network is router via the primary route.

According to yet another advantageous embodiment of the communication system according to the present invention, the first Customer Edge device houses the control means, the monitoring means and the detection means. This is an efficient implementation of the present invention, since only the Customer Edge devices in existing systems need to be updated in order to implement the present invention.

According to still another advantageous embodiment of the communication system according to the present invention, the monitoring means are adapted to monitor the data traffic between the first Provider Edge device and the first Customer Edge device. The monitoring of the data traffic between the first Provider Edge device and the first Customer Edge device is an efficient way to monitor the data traffic of the first Customer Edge device, which further improves the routing of data traffic.

According to an advantageous embodiment of the communication system according to the present invention, the detection means are adapted to detect when the data traffic flow between the first Provider Edge device and the first Customer Edge device decreases and stays below a certain level during a first time period. This is an efficient way to detect failures of the data traffic of the first Customer Edge, providing an improved and more secure routing of data traffic.

According to a further advantageous embodiment of the communication system according to the present invention, where the monitoring means are adapted to monitor the data traffic between the first Provider Edge device and the first Customer Edge device, the detection means are adapted to detect when acknowledgement message IP packets are not received by a certain amount of opened Transmission Control Protocol connections associated with the first Customer Edge device. This is an efficient way to detect failures of the data traffic of the first Customer Edge, providing an improved and more secure routing of data traffic.

According to another advantageous embodiment of the communication system according to the present invention, the control means are adapted to set the state of the first Customer Edge device to the active state after a second time period. Advantageously, the control means are adapted to set the state of the first Customer Edge device to the inactive state for a time period corresponding to the second time period when failure of the data traffic of the first Customer Edge device is detected, after which the Customer Edge device is activated at data traffic is again routed via the primary route. The second time period can be adjusted and varied to be adapted to the specific circumstances. This further improves the efficiency of the routing of data traffic. The second time period is set to be long enough, e.g. 30 to 60 minutes, whereby any unnecessary switching between the first Customer Edge device and the secondary route and any second Customer Edge device is avoided. Hereby, a more stable data traffic flow is provided and data packet losses caused by unnecessary switchover are avoided.

According to an advantageous embodiment of the method according to the present invention, a second Customer Edge device is controlled to provide the secondary connection to the backbone network, and a second Provider Edge device is controlled to route data traffic between the second Customer Edge device and the backbone network via said secondary route.

According to a further advantageous embodiment of the method according to the present invention, the first Customer Edge device is adapted to be in a Hot Standby Router Protocol state which is inactive or active, and said setting comprises the step of setting the Hot Standby Router Protocol state of the first Customer Edge device.

According to another advantageous embodiment of the method according to the present invention, the method is characterized by disabling the Wide Area Network interface associated with the first Customer Edge device when the state of the first Customer Edge device is set to the inactive state.

According to yet another advantageous embodiment of the method according to the present invention, said monitoring, said detection and said setting are executed from the first Customer Edge device.

According to still another advantageous embodiment of the method according to the present invention, said monitoring comprises the step of monitoring the data traffic between the first Provider Edge device and the first Customer Edge device.

According to an advantageous embodiment of the method according to the present invention, said detection comprises the step of detecting when the data traffic flow between the first Provider Edge device and the first Customer Edge device decreases and stays below a certain level during a first time period.

According to a further advantageous embodiment of the method according to the present invention, where said monitoring comprises the step of monitoring the data traffic between the first Provider Edge device and the first Customer Edge device, said detection comprises the step of detecting when acknowledgement message IP packets are not received by a certain amount of opened Transmission Control Protocol connections associated with the first Customer Edge device.

According to another advantageous embodiment of the method according to the present invention, said setting comprises the step of setting the state of the first Customer Edge device to the active state after a second time period.

Positive effects of each of the above-mentioned embodiments of the method according to the present invention can be found in connection with the embodiment of the communication systems comprising the corresponding features.

The above-mentioned object of the present invention is also attained by providing at least one computer program product directly loadable into the internal memory of at least one digital computer, comprising software code portions for routing data traffic from and to a backbone network, where a first Provider Edge device routes data traffic between a first Customer Edge device and the backbone network via a primary route, by monitoring the data traffic of the first Customer Edge device providing a primary connection to the backbone network, detecting failure of the data traffic of the first Customer Edge device, setting the state of the first Customer Edge device to an inactive state when failure of the data traffic of the first Customer Edge device is detected, in which inactive state the first Customer Edge device is disabled for any routing, and providing a secondary connection to the backbone network via a secondary route when said at least one product is/are run on said at least one computer. The first Customer Edge device may be adapted to be in a Hot Standby Router Protocol state which is inactive or active, and the software code portions for setting the state of the first Customer Edge device may include setting the Hot Standby Router Protocol state of the first Customer Edge device. The at least one computer program product may also include software code portions for disabling a Wide Area Network interface associated with the first Customer Edge device when the state of the first Customer Edge device is set to the inactive state. The software code portions for monitoring the data traffic may include monitoring the data traffic between the first Provider Edge device and the first Customer Edge device. The software code portions for detecting failure of the data traffic may include detecting when the data traffic flow between the first Provider Edge device and the first Customer Edge device decreases and stays below a certain level during a first time period. The software code portions for detecting failure of the data traffic may include detecting when acknowledgement message IP packets are not received by a certain amount of opened Transmission Control Protocol connections associated with the first Customer Edge device.

BRIEF DESCRIPTION OF THE DRAWINGS

The present invention will now be described, for exemplary purposes, in more detail by way of embodiments and with reference to the enclosed drawings, in which.

DETAILED DESCRIPTION OF PREFERRED EMBODIMENTS

Abbreviations

Figure 1:
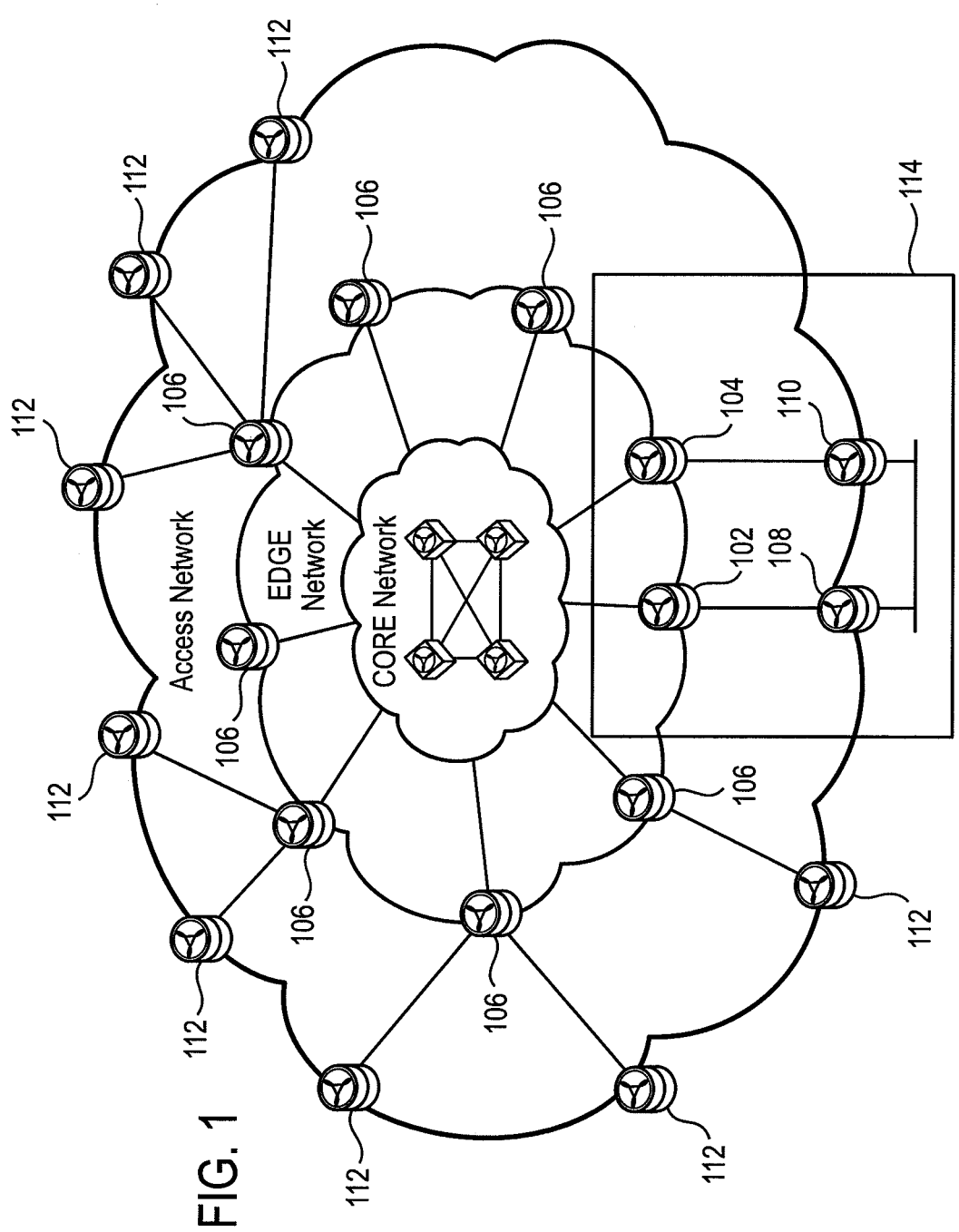
FIGS. 1 and 2 are schematic views illustrating communication systems according to prior art.

AS Autonomous Systems
BGP Boarder Gateway Protocol
CE Customer Edge
CPE Customer Premises Equipment
HSRP Hot Standby Router Protocol
IGP Interior Gateway Protocol
IP Internet Protocol
LAN Local Area Network MPLS Multi Protocol Label Switching
PE Provider Edge
SLA Service Level Agreement
TCP Transmission Control Protocol
VPN Virtual Private Network
VRF VPN Routing and Forwarding
WAN Wide Area Network FIG. 1 schematically illustrates a MPLS network according to prior art, where a backbone network covers a Core network, and an Edge network (a border network) connects the Core network to an Access network. Between the Edge network and the Access network several PE devices 102, 104, 106, in the form of PE routers, are provided. Several CE devices 108, 110, 112, or CPEs, are connectable to the backbone network via the PE devices 102, 104, 106 in a manner known in prior art, and a CE device 108, 110, 112 connects a costumer network, e.g. a LAN, to the provider's backbone network via the Access network. The PE device 102, 104, 106 is connected to backbone network and connects a CE device 108, 110, 112 to the backbone network via the access network. All routing intelligence of the network resides in the Core network and the Edge network. Here, the Edge network is a logical network which includes all PE devices 102, 104, 106 connectable to the backbone network. BGP is the most common routing protocol used. Two CE devices 108, 110 and two PE devices 102, 104 form together a redundant environment 114 in a way know in the prior art by means of appropriate BGP functionalities and routing protocols.

Figure 2:
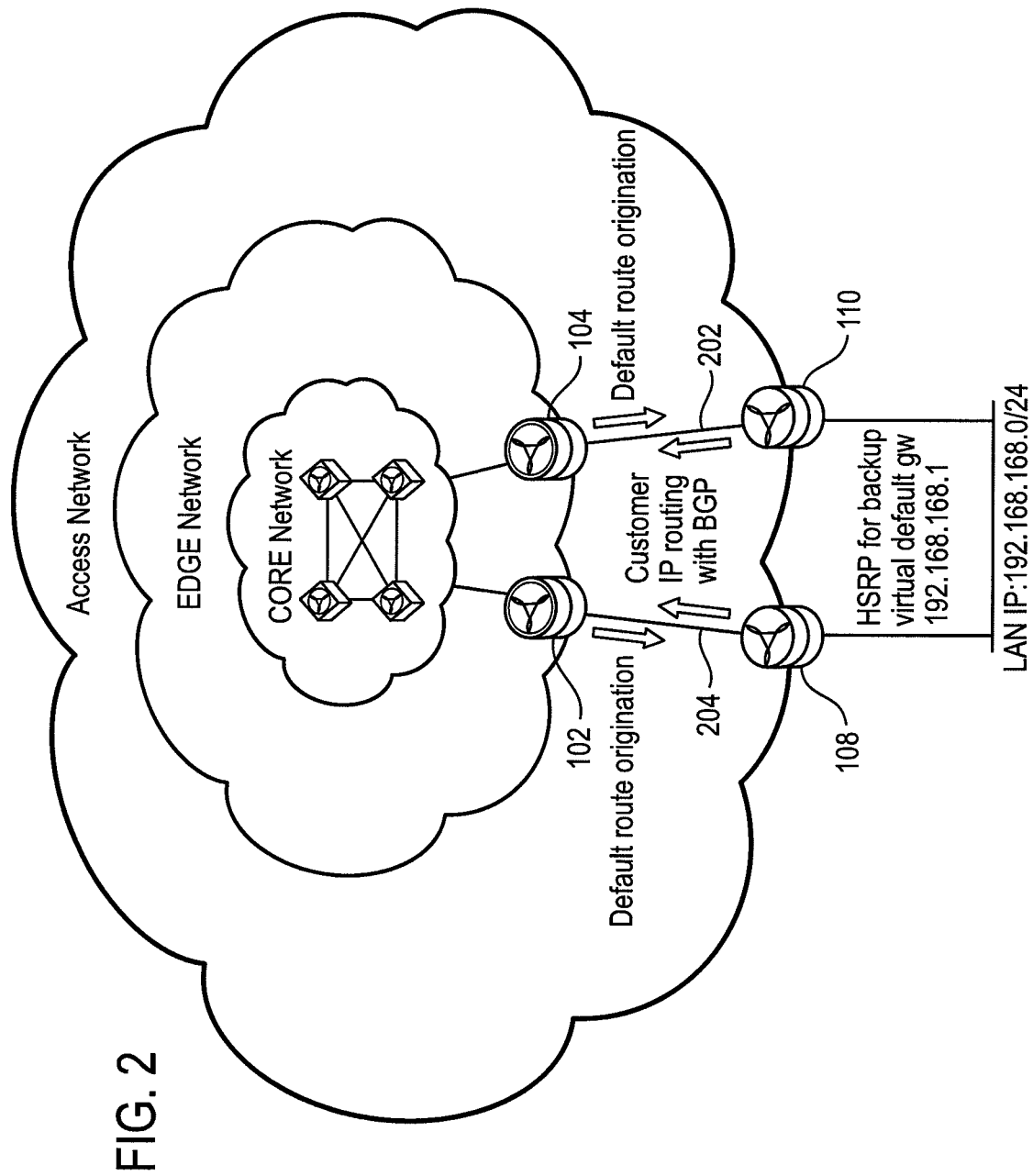

FIG. 2 illustrates in more detail how the redundant environment or redundant functionality is built up in the MPLS network of FIG. 1. Both of the two PE devices 102, 104 forward a default route with different priorities to the CE devices 108, 110. Customer networks (IP:s inside LAN) are advertised with the same prints ciple towards the PE devices 102, 104. Customer network routing can be performed either in the CE devices 108, 110 or the PE devices 102, 104. The primary CE device 110 provides a primary connection to a customer, and the secondary CE device 108 provides a secondary connection to the customer. The PE device 104 takes the role of the primary PE router and routes data traffic between the primary CE device 110 and the backbone network via a primary route 202. The PE device 102 takes the role of the secondary PE router and is adapted to route data traffic between the secondary CE device 108 and the backbone network via a secondary route 204.

When failure occurs in the prior art MPLS network in the form of problems for the primary PE device 104 to forward some or all data traffic, which can be the result of a corrupted routing table or a processor card problem, or any other functionality failure, the primary CE device 110 will still receive default origination from the primary PE device 104, so from a routing point of view, everything is up and running as normal and the failure of the data traffic is not detected. However, no TCP connections associated with the primary CE device 110 are established, and the data traffic of the primary CE device 110 decreases towards zero. Since the failure of the data transmission is not detected and the routing appears to be working without any failure, and the primary CE device 110 appears to receive and transmit data traffic, the backup functionality is not initiated, and the customer has no connectivity to the backbone network.

Figure 3:
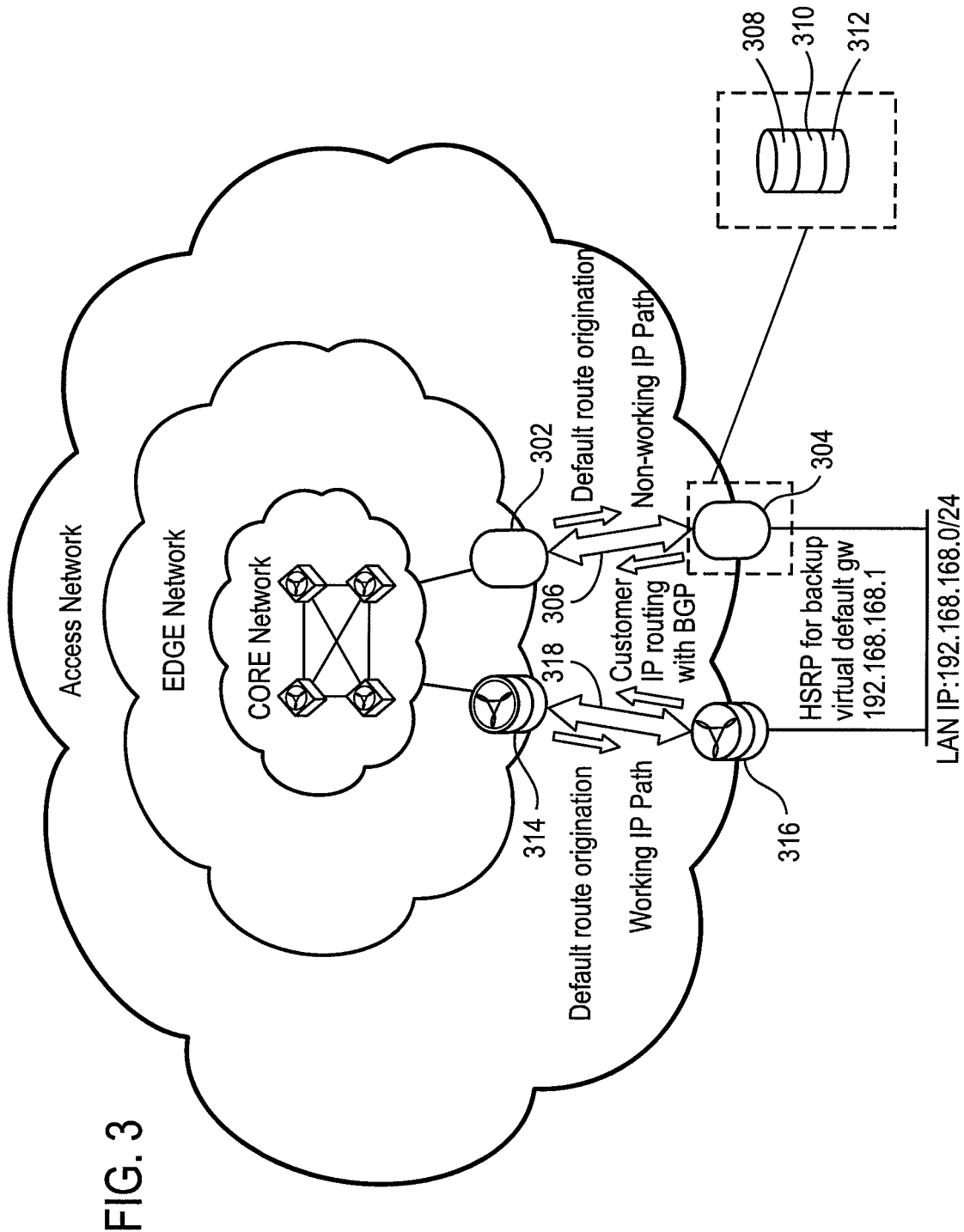
FIGS. 3 and 4 are schematic views illustrating aspects of the communication system according to the present invention.
Figure 4:
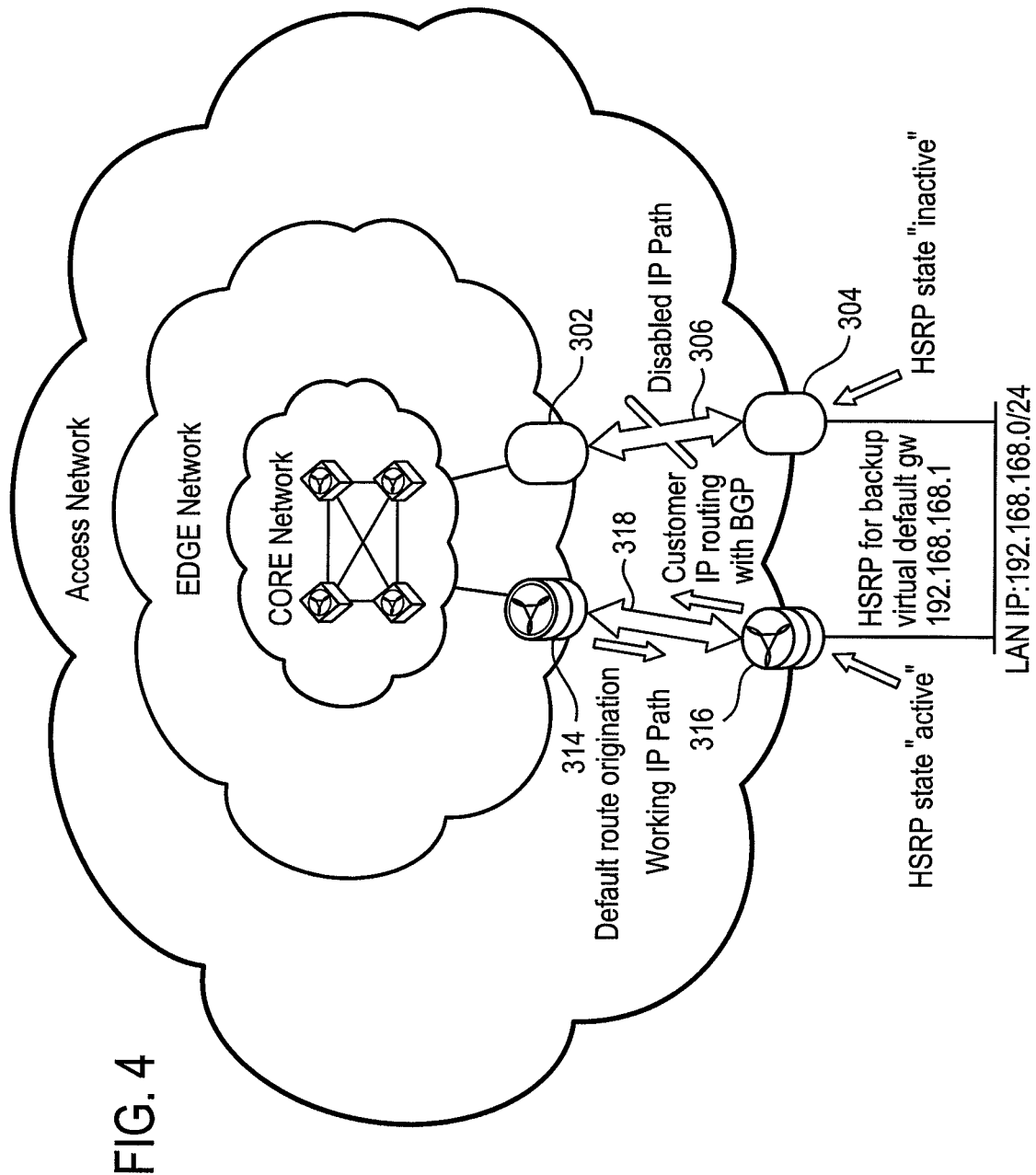

FIGS. 3 and 4 schematically illustrate aspects of the communication system according to the present invention, where conventional components needed to build the system in full are not described. The communication system comprises a first PE device 302, in the form of a PE router, connectable to a backbone network which covers a Core network, and a first CE device 304, in the form of a CPE, providing a primary connection for the customer/subscriber or the customer network, e.g. LAN, to the backbone network. CPE can be any hardware within the customer network, e.g. Routers, LAN Switches etc. The first PE device 302 is adapted to route data traffic between the first CE device 304 and the backbone network via a primary route 306. The first CE device 304 is adapted to be in an active HSRP state or in an inactive HSRP state, in which inactive HSRP state the first CE device 304 is disabled for any routing of data traffic.

The first CE device 304 includes control means 308 for setting the state of the first CE device 304, monitoring means 310 for monitoring the data traffic of the first CE device 304, and detection means 312 for detecting failure of the data traffic of the first CE device 304. Said means 308, 310, 312, or components 308, 310, 312, are indicated in the enlarged view of the first CE device 304 in FIG. 3. Said means 308, 310, 312 can also be located elsewhere within the system.

Further, the communication system includes a second PE device 314, in the form of PE router, connectable to the backbone network, and a second CE device 316, in the form of a CPE, providing a secondary connection to the backbone network, and the second PE device 314 is adapted to route data traffic between the second CE device 316 and the backbone network via a secondary route 318. The PE devices 302, 314 are provided between the Edge network and the Access network in a way known in prior art. The second CE device 316 is also adapted to be in an active HSRP state or in an inactive HSRP state, or expressed in other words, each of the two CE devices 304, 316 has a Hot Standby Router Protocol running in state which is inactive or active. Here, only one of the first and second CE devices 304, 316 is in the active HSRP state whereas the other CE device is in the inactive HSRP state.

The monitoring means 310 are adapted to monitor the data traffic, WAN traffic, between the first PE device 302 and the first CE device 304. The detection means 312 are adapted to detect when the data traffic flow between the first PE device 302 and the first CE device 304 decreases and stays below a certain level during a first time period. Further, the detection means 312 are adapted to detect when acknowledgement message IP packets are not received by a certain amount of opened TCP connections associated with the first CE device 304, herein with regard to IP packets towards the backbone network.

When failure occurs in the system of FIG. 3 in the form of problems for the primary PE device 302 to forward some or all data traffic, resulting from corrupted routing table or a processor card problem or any other functionality failure, the primary CE device 304 will still receive default origination from the primary PE device 302, and the backup functionality is not initiated. However, the data traffic flow will decrease and stay below a certain level and/or acknowledgement message IP packets (connection ACK packets) will not be received by a certain amount of opened TCP connections of the first CE device 304, and this is detected by the detection means 312 of the system according to the present invention.

The control means 308 are adapted to set the state of the first CE device 304 to the inactive state after about 40-60 seconds, or after any other suitable time period, when the above-mentioned failure of the data traffic is detected by the detection means 312 and if the first CE device 304 is still in the active state, whereupon the system is adapted to provide the secondary connection to the backbone network via the secondary route 318 at LAN level. The control means 308 are also adapted to disable the WAN interface associated with the first CE device 304 when the control means 308 set the state of the first CE device 304 to the inactive state. Hereby, any routing via the first CE device 304 is disabled, and all the data traffic is forced to be routed to/from the second CE device 316.

FIG. 4 illustrates how the control means 308 have disabled the primary route 306 by setting the HSRP state of the first CE device 304 to the inactive state, whereas the HSRP state of the second CE device 316 is set to be active.

The control means 308 are adapted to set the state of the first CE device 304 to the active state after a second time period, e.g. any time period between 1 and 8 hours, and at the same time the control means 308 are adapted to activate the WAN interface associated with the first CE device 304, and the data traffic is again routed via the primary route 306. After switching back to the primary route 306, the monitoring means 310 and detection means 312 continue the monitoring and detection, respectively, and if the primary route 306 is still not functioning properly, the control means 308 again set the state of the first CE device 304 to the inactive state, and the data traffic is routed via the secondary route 318.

The second time period can be adjusted and varied to be adapted to the specific circumstances, and can for example be increased by 2 hours for each time the control means 308 set the state of the first CE device 304 to the active state and the failure of the primary route 306 is still present.

Naturally, it is to be understood that the communication system according to the present invention can include further CE devices and PE devices. Naturally, the control means 308, the monitoring means 310 and the detection means 312 are advantageously implemented in all the primary CE devices of a system.

Figure 5:
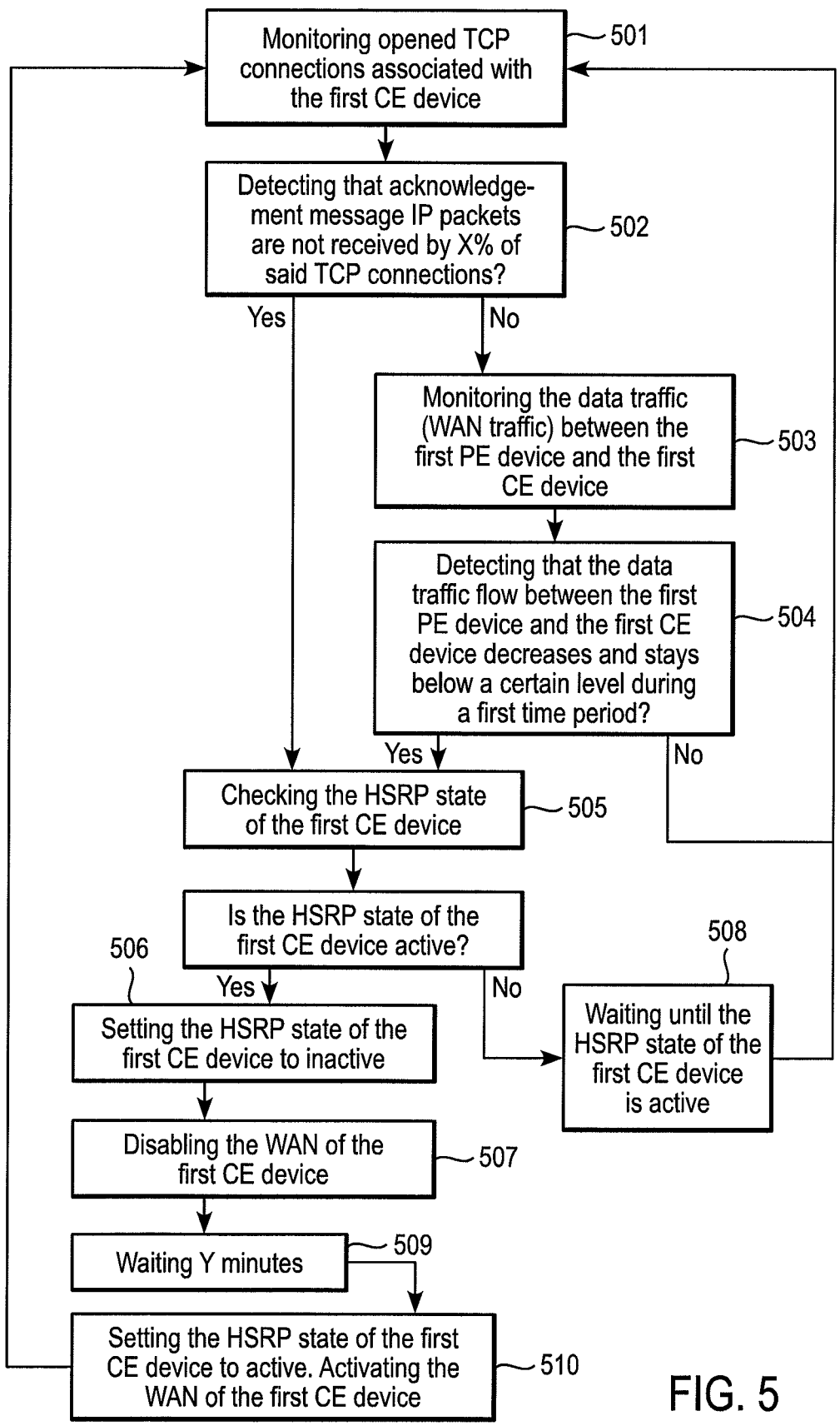
FIG. 5 is a schematic flowchart illustrating aspects of the method according to the present invention.

FIG. 5 is a schematic flowchart illustrating aspects of the method for routing data traffic from and to a backbone network according to the present invention, where a first PE device routes data traffic between a first CE device and the backbone network via a primary route. The first CE device provides a primary connection to the backbone network, and the first CE device is adapted to be in an active state or an inactive state. The aspects of the method disclosed in FIG. 5 include the following steps: The opened TCP connections associated with the first CE device are monitored, at step 501. At step 502, a first detection is performed. If X % of the opened TCP connections do not receive acknowledgement message IP packets, then step 505 is executed, otherwise step 503 is executed. At step 503, the data traffic, the WAN traffic, between the first PE device and the first CE device is monitored, and a second detection is performed at step 504. If the data traffic flow between the first PE device and the first CE device decreases and stays below a certain level during a first time period, then step 505 is executed, otherwise the procedure is returned to step 501.

At step 505, the HSRP state of the first CE device is checked. If the HSRP state is active, the HSRP state is set to the inactive state, at step 506. When the HSRP state of the first CE is set to inactive, also the WAN interface associated with the first Customer Edge device is disabled, at step 507. When set to the inactive state, the first CE device is disabled for any routing of data traffic. Since the CE device is disabled, the data traffic will be forced or routed via a secondary route, at LAN level, to/from a provided secondary connection to the backbone network. A second CE device is controlled to provide the secondary connection to the backbone network, and a second PE device is controlled to route data traffic between the second Customer Edge device and the backbone network via said secondary route. Hereby, the routing is recovered in a fast and efficient way.

If the HSRP state of the first CE device is inactive, it means that the conventional redundant functionality already has initiated rerouting and forced rerouting is not needed. The procedure then continues to an "idle state", at step 508, and waits until the HSRP state of the first CE device is active again, and thereafter is returned to step 501.

At step 509, the HSRP state is kept inactive during a second time period, Y minutes. After the second time period, Y minutes, the HSRP state of the first CE device is set to the active state at step 510, and at the same time the WAN interface associated with the first CE device is activated again, and the data traffic will be routed via the primary route and the first CE device.

If the failure which caused the method to set HSRP state of the first CE device to the inactive state still exists and has not been overcome, the method will again set the HSRP state of the first CE device to the inactive state in accordance the flowchart.

Said monitoring at 501 and 503, said detection at 502 and 504 and said setting of the state and of the CE device and the control of the WAN protocol of the first CE device 506, 507, 510 are executed from the first CE device.

Further embodiments of the method are naturally possible. According to one embodiment, the WAN interface associated with the first CE device is kept unchanged. According to another embodiment, steps 501 and 502 can be omitted. According to yet another embodiment, steps 503 and steps 504 can be omitted. According still another embodiment, steps 503 and 504 can be performed before any performance of the steps 501 and 502.

Figure 6:
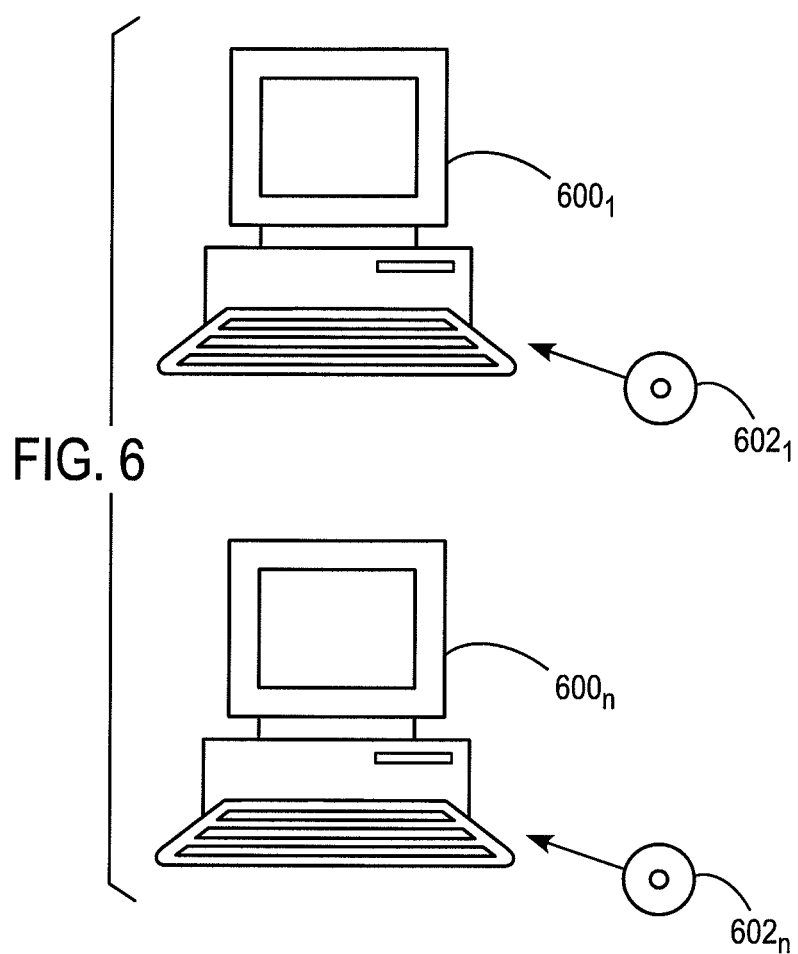
FIG. 6 is a schematic diagram of some computer program products according to the present invention.

In FIG. 6 there is disclosed a schematic diagram of some computer program products according to the present invention. There is disclosed n different digital computers $600_1, \ldots, 600_n$, wherein n is an integer. There is also disclosed n different computer program products $602_1, \ldots, 602_n$, here showed in the form of compact discs. The different computer program products $602_1, \ldots, 602_n$ are directly loadable into the internal memory of the n different digital computers $600_1, \ldots, 600_n$. Each computer program product $602_1, \ldots, 602_n$ comprises software code portions for performing some or all the steps of FIG. 5 when the product(s) $602_1 \ldots, 602_r$, is/are run on said computer(s) $600_1, \ldots, 600_n$. Said computer program products $602_1, \ldots, 602_n$ can e.g. be in the form of floppy discs, RAM discs, magnetic tapes, opto-magnetical discs or any other suitable products.

The invention is not limited to the embodiments described in the foregoing. It is to be understood that that many different modifications are possible within the scope of the appended claims.

The invention claimed is:

1. A communication system comprising:
   a first Provider Edge device adapted to be connected to a backbone network;
   a first Customer Edge device providing a primary connection to the backbone network, the first Provider Edge device being adapted to route data traffic between the first Customer Edge device and the backbone network via a primary route, and the first Customer Edge device being adapted to be in an active state or an inactive state, in which inactive state the first Customer Edge device is disabled for any routing, and the system is adapted to provide a secondary connection to the backbone network via a secondary route;
   control means for setting the state of the first Customer Edge device;

monitoring means for monitoring the data traffic between the first Provider Edge device and the first Customer Edge device; and detection means for detecting when the data traffic flow between the first Provider Edge device and the first Customer Edge device decreases and stays below a certain level during a first time period in order to detect failure of the data traffic of the first Customer Edge device, wherein the control means is adapted to set the state of the first Customer Edge device to the inactive state when failure of the data traffic of the first Customer Edge device is detected by means of the detection means, whereupon the system is adapted to provide the secondary connection to the backbone network via the secondary route, wherein the first Customer Edge device is adapted to be in a Hot Standby Router Protocol state which is inactive or active, and wherein the control means is adapted to set the Hot Standby Router Protocol state of the first Customer Edge device.

2. The communication system according to claim 1, comprising:

a second Provider Edge device adapted to be connected to the backbone network; and a second Customer Edge device providing the secondary connection to the backbone network, wherein the second Provider Edge device is adapted to route data traffic between the second Customer Edge device and the backbone network via the secondary route.

3. The communication system according to claim 1, wherein the control means is adapted to disable a Wide Area Network interface associated with the first Customer Edge device when the control means sets the state of the first Customer Edge device to the inactive state.

4. The communication system according to claim 1, wherein the first Customer Edge device houses the control means, the monitoring means and the detection means.

5. The communication system according to claim 1, wherein the detection means is adapted to detect when acknowledgement message IP packets are not received by a certain amount of opened Transmission Control Protocol connections associated with the first Customer Edge device.

6. A method for routing data traffic from and to a backbone network where a first Provider Edge device routes data traffic between a first Customer Edge device and the backbone network via a primary route, the first Customer Edge device providing a primary connection to the backbone network, and the first Customer Edge device is adapted to be in an active state or an inactive state, in which inactive state the first Customer Edge device is disabled for any routing, the method comprising:

monitoring the data traffic between the first Provider Edge device and the first Customer Edge device;

detecting when the data traffic flow between the first Provider Edge device and the first Customer Edge device decreases and stays below a certain level during a first time period in order to detect failure of the data traffic of the first Customer Edge device;

setting the state of the first Customer Edge device to the inactive state when failure of the data traffic of the first Customer Edge device is detected; and providing a secondary connection to the backbone network via a secondary route, wherein the first Customer Edge device is adapted to be in a Hot Standby Router Protocol state which is inactive or active, and wherein the setting comprises setting the Hot Standby Router Protocol state of the first Customer Edge device.

7. The method according to claim 6, further comprising: disabling a Wide Area Network interface associated with the first Customer Edge device when the state of the first Customer Edge device is set to the inactive state.

8. The method according to claim 6, wherein the detecting comprises detecting when acknowledgement message IP packets are not received by a certain amount of opened Transmission Control Protocol connections associated with the first Customer Edge device.

9. A non-transitory computer-readable medium containing instructions which, when executed on a computer, perform the steps of the method according to any of claims 6, 7, and 8.

* * * * *